May 10, 1966  S. M. COX ET AL  3,250,849
ELECTRICAL CONNECTION
Filed Aug. 6, 1963

METALLIC LEADS

ZIRCON SIDE BLOCK

VANADIUM PENTOXIDE

TINOXIDE ELECTRODE ASSEMBLY

FOUR PART ZIRCON END BLOCK

ZIRCON BASE BLOCK

INVENTORS
SHAUN MATURIN COX
ROBERT FERRY
BY JACOBS & JACOBS
their ATTORNEYS

United States Patent Office 3,250,849
Patented May 10, 1966

3,250,849
ELECTRICAL CONNECTION
Shaun Maturin Cox, South Shields, and Robert Ferry, Sunderland, England, assignors to Morgan Refractories Limited, Neston, Wirral, England, a British company
Filed Aug. 6, 1963, Ser. No. 300,164
Claims priority, application Great Britain, Aug. 14, 1962, 31,169/62
4 Claims. (Cl. 174—94)

This invention is concerned with improvements in or relating to electrical contacts and more particularly with such contacts which have to be effective at high temperatures.

There exists considerable difficulty in establishing good electrical contact between electrically conducting members which are required to operate at high temperatures for example as exist in the electrical connections to furnace electrodes particularly in the case where such members are not of the same material. The difficulty is particularly marked in the case where one or more of the members is of ceramic material, for example where one member is of ceramic material and the other member is metallic.

The high cost of oxidation-resistant noble metals precludes their use for such contacts, whereas the commoner metals tend to develop an oxide scale or coating at the contact surface, such scale or coating preventing the intimate electrical contact between the members which is necessary for an efficient contact. If the members are required to carry appreciable electrical current the high electrical resistance of the contact causes heat to be generated so that the contact becomes hotter and thus more prone to oxidation with progressive deterioration of the contact.

If one of the members is ceramic material it is in any case difficult to establish good electrical contact between the ceramic and say a metallic connection because of the incompatibility of the oxide ceramic and the metal and because of thermal expansion differences between these materials.

We have now found that good electrical contact can be established between electrically conducting members, which may be of similar or dissimilar materials, which are required to operate at high temperatures, by using vanadium pentoxide or a material yielding vanadium pentoxide under the operating conditions as contact material.

According to the invention therefore, there is provided an electrical element comprising two electrically conducting members adapted to operate at high temperatures and an electrical contact between the two members, said electrical contact being of a material comprising vanadium pentoxide or a material yielding vanadium pentoxide under the operating conditions.

The invention also provides a method for establishing electrical contact between two electrically conducting members adapted to operate at high temperatures which comprises applying to either or both of the members a contact material comprising vanadium pentoxide or a material yielding vanadium pentoxide under the conditions of operation of the contact.

The invention also provides a material for establishing electrical contact between two electrically conducting members comprising vanadium pentoxide (or a material yielding vanadium pentoxide under the conditions of operation of the contact) together with one or more of the additives hereinafter described.

Generally, the electrical element according to the invention will be operated under such conditions that the vanadium pentoxide is molten and it is under these conditions that the particularly favourable characteristics of vanadium pentoxide as a contact material become apparent, as is more fully explained below.

The invention will now be described more fully with relation to a particular type of contact used in the glass industry, although the applicability of the invention is not to be considered as limited to this particular type of contact as it is of general applicability where electrical contacts are required to operate at high temperatures, for example in the electrical melting of steel. Another possibility is for the contacts at the ends of electrical resistance heating elements, for example those made of non-metallic materials such as silicon carbide.

In the glass industry, a technique of high thermal efficiency for melting glass involves the passage of large electrical currents through the glass contained in a refractory melting chamber, sections of whose walls are of electrically conducting refractory such as tin oxide, such sections functioning as electrodes. In general electrically conducting refractories have also a high thermal conductivity and as a consequence of this the outer surfaces of the electrode block to which metallic electrical contact must be made, tends to run at high temperature or, if artificially cooled, the thermal efficiency of the melting unit is impaired.

In applying the present invention to providing a contact between the electrode blocks and metallic leads which have to be in electrical contact therewith, vanadium pentoxide is applied to the outside surfaces of the electrode blocks and to the metallic surfaces which are to be in contact with the blocks and the temperature raised or allowed to rise until the vanadium pentoxide melts.

It is unnecessary to raise the temperature of the whole of the block or of the metal parts to the melting point of vanadium pentoxide (690° C.). The surfaces only need be heated and the vanadium pentoxide, either alone or with suitable additives, applied and melted on in a manner similar to the soldering of metals.

The vanadium pentoxide which may contain additives such as those described below, may be applied in a liquid medium such as water, acetone, carbon tetrachloride, etc., or may be shaken as a powder on to the preheated parts. Preferably, however, the pentoxide is premelted and formed into a "soldering" rod so that it may be applied to the preheated surfaces in the same way as for a soft soldered joint.

The metal contacting members are held in mechanical contact with the electrode block by external means and the junction heated to unite the parts—more vanadium pentoxide being added to the junction if required.

Such a junction gives excellent electrical performance over an extended range of temperature considerably above and below the melting point of the vanadium oxide mixture.

The effectiveness of vanadium pentoxide as contact material according to the invention appears to result from the physical and chemical properties of the oxides of vanadium. Thus vanadium pentoxide has remarkable wetting powers when molten and readily wets metals and refractory materials. It has relatively high electrical conductivity with a high negative temperature coefficient of resistivity. These properties are remarkably insensitive to most impurities so that the conductivity is not seriously impaired by any solution of the contacting members by the oxide. On the other hand the lower oxides of vanadium and vanadium itself are refractory materials of even higher electrical conductivity than the pentoxide and thus any reduction of the pentoxide by say the metal member or powdered metals deliberately added, causes a setting of the molten oxide and re-oxidation by atmospheric oxygen re-creates the pentoxide, which because of its flow characteristics tends to seal any cavities formed and also protects the metal from oxidation.

The surface tension of the molten pentoxide effectively holds it by capillary attraction in any gaps between the contacting members at temperatures considerably exceeding the melting point. At low temperature where differential thermal expansion of the contacting members may couse shearing of the joint, the temporary high resistance of the contact causes local heating which remelts the pentoxide and thus reseals the joint to conform to the relative extension then prevailing of the dissimilar contacting members. The satisfactory performance at low temperatures is believed to be due to this cause.

Various additives may be added to the vanadium pentoxide, if so desired, to modify its properties. Three classes of additives may be distinguished. They are as follows:

(1) Inert fillers such as alumina and silica. These lower the conductivity of the vanadium pentoxide, increase the mechanical strength and serve to hold the molten pentoxide at high temperature by capillary forces, thus reducing the tendency for the molten oxide to seep away.

(2) Reducing agents which cause reduction of the pentoxide and may, in addition, act as conducting fillers. Examples of such reducing agents include metallic copper and powdered aluminium. Thus, the addition of up to 60% metallic copper powder increases the conductivity of the vanadium pentoxide and serves to hold the vanadium pentoxide and any dissolved copper oxide up to the melting point of copper, and at lower temperatures forms a sinter with some mechanical strength above the melting point of vanadium pentoxide. The addition of powdered aluminium in controlled amounts results in a mixture with self-firing characteristics as a result of an exothermic reaction between the metal and the pentoxide.

(3) Compounds which react chemically or physically to yield solid solutions, glass like bodies or additive compounds in which the conductive property of vanadium pentoxide is maintained or may even be enhanced. Examples of such compounds include divalent oxides which in controlled amounts (e.g. up to 40% by weight) lower the melting point of the vanadium pentoxide and may increase its electrical conductivity at low temperatures. An example of such a divalent oxide is BaO (or $BaO_2$) the addition of which changes the melting character of vanadium pentoxide from a large contraction on freezing to that of a pitch or glass with a softening point rather than a melting point and the large contraction on cooling is suppressed. The electrical conductivity is retained or even increased but this depends also on heat treatment particularly as the proportion of BaO exceeds 40% and at even higher proportions the melting temperature increases rapidly—evidently due to the formation of refractory addition compounds.

Some additives exhibit properties of more than one of the classes above. Thus oxides of copper such as CuO and $Cu_2O$ appear to act in part as a conductive filler (class 2) and as a divalent oxide (class 3).

Examples of specific mixtures of $V_2O_5$ with suitable additives include mixtures of the following constitution Percent by weight (1) $V_2O_5$ _____ 40
BaO _____ 40
Cu _____ 20
(2) $V_2O_5$ _____ 60
Cu powder _____ 40
(3) $V_2O_5$ _____ 70
$Cu_2O$ _____ 30

Preferably the quantity of addivites in the vanadium pentoxide should not exceed 60% by weight, so that the quantity of vanadium pentoxide should be at least 40% by weight or expressed as elemental vanadium 22.5% by weight.

As stated above the vanadium pentoxide may be partly or totally replaced by a material yielding a vanadium pentoxide under the operating conditions. Suitable materials include metallic vanadium as well as the lower oxides of vanadium and vanadates which are converted by oxidation or decomposition on heating to high temperature in an oxidising atmosphere, for example as exists when using the contacts according to the invention.

In order that the invention may be more fully understood the following example of the operation of contact according to the invention is given by way of illustration only:

*Example*

In a glass melting furnace having a refractory wall, sections of which were composed of blocks of a conducting tin oxide refractory material, in order to make electrical contact between the outer surface of these blocks and the electric power leads the latter were first joined to a plate or block of heat resisting steel. The plate was then held adjacent to the refractory block and the surfaces of both were heated to about 700° C. by means of a gas flame. A rod of contact material, made by heating a mixture of 70% $V_2O_5$ and 30% $Cu_2O$ to about 750° C. and moulding it to rod form, was then applied to the hot faces until the rod material flowed to coat both faces. The faces were then placed together and further $V_2O_5$ mixture was added to fill any spaces left between them. The contact thus formed was found to function very satisfactorily when current was fed to the furnace and the temperature at the outer surface of the refractory block was in the region of 700° C.

A glass melting furnace for use in the laboratory embodying the invention is shown in the accompanying drawings in which.

Figure 1:
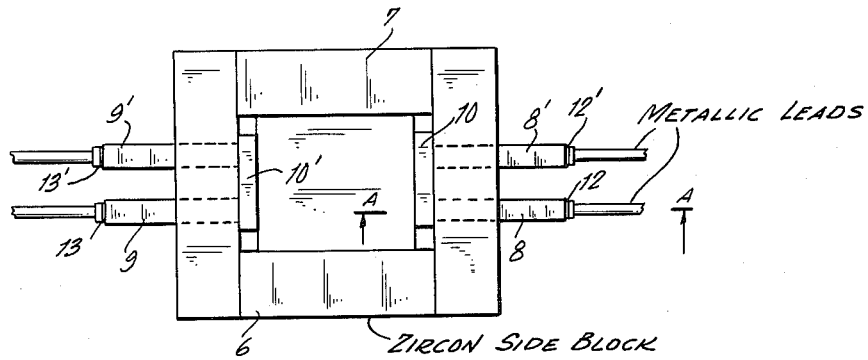
FIGURE 1 is a top view of the furnace.
Figure 2:
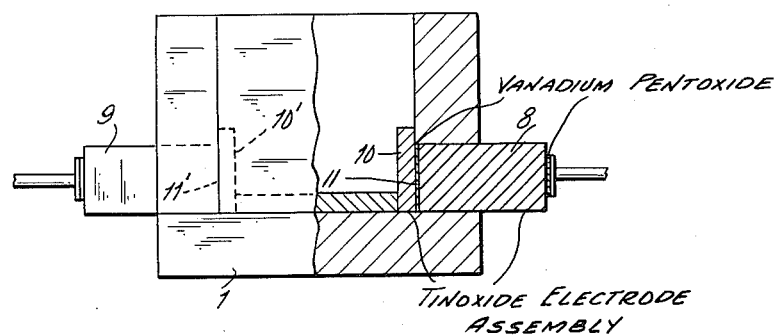
FIGURE 2 is a section of the furnace seen from the side taken through the line A—A.
Figure 3:
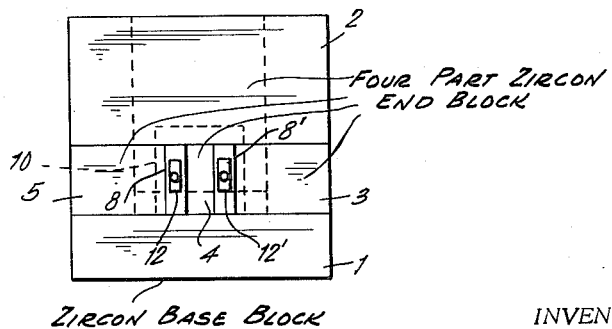
FIGURE 3 is an end view of the furnace shown in FIGURE 1.

Referring to the drawing the furnace is constructed essentially of zircon blocks. These comprise a base block 1, four end blocks 2, 3, 4 and 5 (see FIG. 3) and side blocks 6 and 7 (FIG. 1). Let in to both ends of the furnaces are electrode blocks of tin oxide 8, 8' and 9, 9'. These are brought into electrical contact with tin oxide electrodes 10 and 10' in the furnace through a layer of vanadium pentoxide 11 and 11'. Electrical contact is also established between the electrode blocks 8, 8' and 9 and 9' and metallic leads from the sources of electrical supply, through layers 12, 12' and 13, 13' provided between said electrode blocks and said metallic leads.

We claim:

1. A contact material for use in establishing electrical contact between two electrically conducting members adapted to operate at high temperatures and having a composition selected from the group consisting of the following compositions, in which the percentages are by weight:

Percent
(1) $V_2O_5$ _____ 40
BaO _____ 40
Cu _____ 20
(2) $V_2O_5$ _____ 60
Cu powder _____ 40
(3) $V_2O_5$ _____ 70
$Cu_2O$ _____ 30

2. An electrical element comprising a first electrically conducting member of an electrically high temperature resistant material, a second electrically conducting member of an electrically conducting refractory material and an electrical contact selected from the group consisting of vanadium pentoxide, metallic vanadium oxides of vanadium other than vanadium pentoxide and vanadates disposed between said first and said second member forming an electrical connection therebetween, said contact being molten at operating temperature.

3. An element as claimed in claim 2 in which the first electrically conducting member is of steel and the second electrically conducting member consists essentially of tin oxide.

4. An electrical element according to claim 2 which further comprises an inert filler in combination with said contact, said filler serving to lower the conductivity of the contact material in the molten condition and to hold it in place at high temperature.

References Cited by the Examiner

UNITED STATES PATENTS

| | | | |
|---|---|---|---|
| 2,107,742 | 2/1938 | Ruben | 200—166 |
| 2,171,697 | 9/1939 | Hensel et al. | |
| 3,006,865 | 10/1961 | Ruben | 106—55 X |

ROBERT K. SCHAEFER, *Primary Examiner.*

JOHN F. BURNS, *Examiner.*

H. O. JONES, DARRELL L. CLAY,
*Assistant Examiners.*